(12) United States Patent
Beccari

(10) Patent No.: US 11,598,402 B2
(45) Date of Patent: Mar. 7, 2023

(54) DEVICE FOR THE TRANSMISSION OF ROTARY MOTION AND THE TRANSFER OF AT LEAST ONE FLUID MEDIUM

(71) Applicant: Dana Motion Systems Italia S.R.L., Reggio Emilia (IT)

(72) Inventor: Fabio Beccari, Bibbiano (IT)

(73) Assignee: Dana Motion Systems Italia S.R.L., Reggio Emilia (IT)

( * ) Notice: Subject to any disclaimer, the term of this patent is extended or adjusted under 35 U.S.C. 154(b) by 0 days.

(21) Appl. No.: 16/967,628

(22) PCT Filed: Feb. 5, 2019

(86) PCT No.: PCT/EP2019/052759
§ 371 (c)(1),
(2) Date: Aug. 5, 2020

(87) PCT Pub. No.: WO2019/154798
PCT Pub. Date: Aug. 15, 2019

(65) Prior Publication Data
US 2021/0268668 A1    Sep. 2, 2021

(30) Foreign Application Priority Data
Feb. 6, 2018    (IT) .......................... 102018000002424

(51) Int. Cl.
*B25J 9/10*    (2006.01)
*F16H 48/10*    (2012.01)
(Continued)

(52) U.S. Cl.
CPC .............. *F16H 48/10* (2013.01); *B25J 9/102* (2013.01); *B25J 19/0041* (2013.01); *F16L 39/06* (2013.01)

(58) Field of Classification Search
CPC ....... B25J 9/102; B25J 19/0041; F16H 48/10; E02F 9/121; E02F 9/126; F16L 39/04; F16L 39/06
See application file for complete search history.

(56) References Cited

U.S. PATENT DOCUMENTS

| 3,351,360 A | 11/1967 | Faccou |
| 4,378,959 A | 4/1983 | Susnjara |

(Continued)

FOREIGN PATENT DOCUMENTS

| JP | H0193695 A | 4/1989 |
| JP | H07308887 A | 11/1995 |
| JP | 11-182402 | * 7/1999 |

OTHER PUBLICATIONS

ISA European Patent Office, International Search Report Issued in Application No. PCT/EP2019/052759, dated May 10, 2019, WIPO, 3 pages.

*Primary Examiner* — William C Joyce
(74) *Attorney, Agent, or Firm* — McCoy Russell LLP

(57) ABSTRACT

A device for transmission of rotary motion and transfer of a fluid medium, comprising a planetary gear train for transmission of rotary motion about a main axis which has at least one reduction stage which is provided with a sun gear, which rotates about the main axis, and a toothed ring gear which are mutually concentric and between which at least two planetary gears are engaged which are supported in rotation at least about the respective longitudinal axes which are parallel to the main axis by a planetary gear carrier; such planetary gear train is provided with a driving input sun gear and with an output ring gear and with an output planetary gear carrier, of which one can move in rotation about the main axis with respect to the other; and a rotary joint which extends externally to the planetary gear train for transfer of the fluid medium.

20 Claims, 5 Drawing Sheets

(51) Int. Cl.
*B25J 19/00* (2006.01)
*F16L 39/06* (2006.01)

(56) References Cited

U.S. PATENT DOCUMENTS

| | | | |
|---|---|---|---|
| 4,438,309 A | 3/1984 | Zimmer | |
| 6,325,123 B1* | 12/2001 | Gao | B60C 23/00318 |
| | | | 152/416 |
| 2011/0045932 A1 | 2/2011 | Fauteux et al. | |
| 2015/0136291 A1* | 5/2015 | Grimm | B60C 23/00363 |
| | | | 152/417 |

* cited by examiner

DEVICE FOR THE TRANSMISSION OF ROTARY MOTION AND THE TRANSFER OF AT LEAST ONE FLUID MEDIUM

CROSS-REFERENCE TO RELATED APPLICATION(S)

The present application is a U.S. National Phase of International Patent Application Serial No. PCT/EP2019/052759, entitled "DEVICE FOR THE TRANSMISSION OF ROTARY MOTION AND THE TRANSFER OF AT LEAST ONE FLUID MEDIUM," filed on Feb. 5, 2019. International Patent Application Serial No. PCT/EP2019/052759 claims priority to Italian Patent Application No. 102018000002424, filed on Feb. 6, 2018. The entire contents of each of the above-mentioned applications are hereby incorporated by reference in their entirety for all purposes.

TECHNICAL FIELD

The present invention relates to a device for the transmission of rotary motion and the transfer of at least one fluid medium.

BACKGROUND AND SUMMARY

Numerous works vehicles are known in which the corresponding moving elements have actuation systems both of the mechanical type, and of the fluid-operated type (hydraulic or pneumatic).

This occurs typically in the movement arms that are provided, for example, in industrial robots, in apparatuses for moving/lifting or in apparatuses for construction machinery.

In such movement arms there is a plurality of longitudinal sections which can move with respect to each other and which comprise at least a first section and a second section which are consecutive, of which the second can move with respect to the first in rotation about its own longitudinal axis. Furthermore, hydraulic or pneumatic actuation means are generally provided, of the type of cylinders or motors, for actuating further movement of the second section or of elements downstream of it, which are connected to a hydraulic or pneumatic management circuit, which is associated with the first section or is upstream of it.

In order to rotationally actuate the second section with respect to the first section, a planet gear transmission assembly with at least one reduction stage can be interposed, which is provided with an input sun gear which is associated with an actuation motor and with an output planet gear carrier and with an output toothed ring gear, one of which is connected to the first section and acts as a fixed element and the other to the second section and acts as a follower element.

Furthermore, for connecting the actuators to the management circuit, there is a bundle of tubes which need to be supported externally to the sections of the arm.

This conventional solution is not devoid of drawbacks, among which is the fact that the tubes hinder the movement of the sections of the arm, not least because they need to be dimensioned with greater length in order not to excessively limit the angle of rotation that can be described by the second section with respect to the first, which in any case is less than a complete rotation.

Furthermore, in use, such tubes are subject to stresses deriving from the movement of the articulated arm, which can cause wear and tear thereof with consequent loss of the fluid medium circulating in them, such that they require frequent maintenance operations and sometimes substitution, which reduce the efficiency of the works vehicles.

Alternatively, in order to rotationally actuate the second section with respect to the first section the use is known of an externally-toothed ring gear, or perforated center bearing, which is associated with the second section proper and is rotationally actuated by way of a motorized pinion or a motorized endless screw, which is engaged with the ring gear.

In this case the tube bundle can be made to pass at least partially inside the ring gear, while still presenting problems of bulk, limitation of the movement of the second section with respect to the first section, and risk of damage that are entirely similar to the problems mentioned above.

In some large-dimensioned applications, like cranes and movement towers, the use is known of perforated center bearings of large dimensions, in the central hole of which a hydraulic or pneumatic joint can be accommodated for the hydraulic or pneumatic connections.

Such technical solution, however, cannot be applied to movement arms, for reasons of weight and space occupation of the components.

The aim of the present invention is to eliminate the above mentioned drawbacks in the background art by providing a device for the transmission of rotary motion and the transfer of at least one fluid medium that has wide flexibility of use and which makes it possible to optimize the performance of the works vehicles on which it is installed, without entailing limitations in the movement thereof.

In particular in the event of application to movement arms, the device according to the invention makes it possible to widen the angle of rotation of one section with respect to the other, by allowing the free rotation of one section with respect to the other.

Within this aim, an object of the present invention is to reduce the need to carry out maintenance interventions or the substitution of component parts, by enabling an increase in the reliability and in the efficiency of the works vehicles on which it is installed.

Another object of the present invention is to provide a simple structure that is easy and practical to implement, safe in use and effective in operation, and at low cost.

This aim and these and other objects that will become more apparent hereinafter are achieved by a device for the transmission of rotary motion and the transfer of at least one fluid medium which comprises a planetary gear train for the transmission of rotary motion about a main axis which has at least one reduction stage which is provided with a sun gear, which rotates about said main axis, and a toothed ring gear which are mutually concentric and between which at least two planet gears are engaged which are supported in rotation at least about the respective longitudinal axes which are parallel to said main axis by a planet gear carrier, the planetary gear train being provided with a driving input sun gear and with an output ring gear and with an output planet gear carrier, of which one can move in rotation about said main axis with respect to the other, and means for the transfer of at least one fluid medium, characterized in that said means for the transfer of at least one fluid medium comprise a rotary joint which extends externally to said planetary gear train.

BRIEF DESCRIPTION OF THE FIGURES

Further characteristics and advantages of the present invention will become better apparent from the detailed description of two preferred, but not exclusive, embodiments of a device for the transmission of rotary motion and the transfer of at least one fluid medium, which are illustrated for the purposes of non-limiting example in the accompanying drawings wherein.

DETAILED DESCRIPTION

Figure 1:
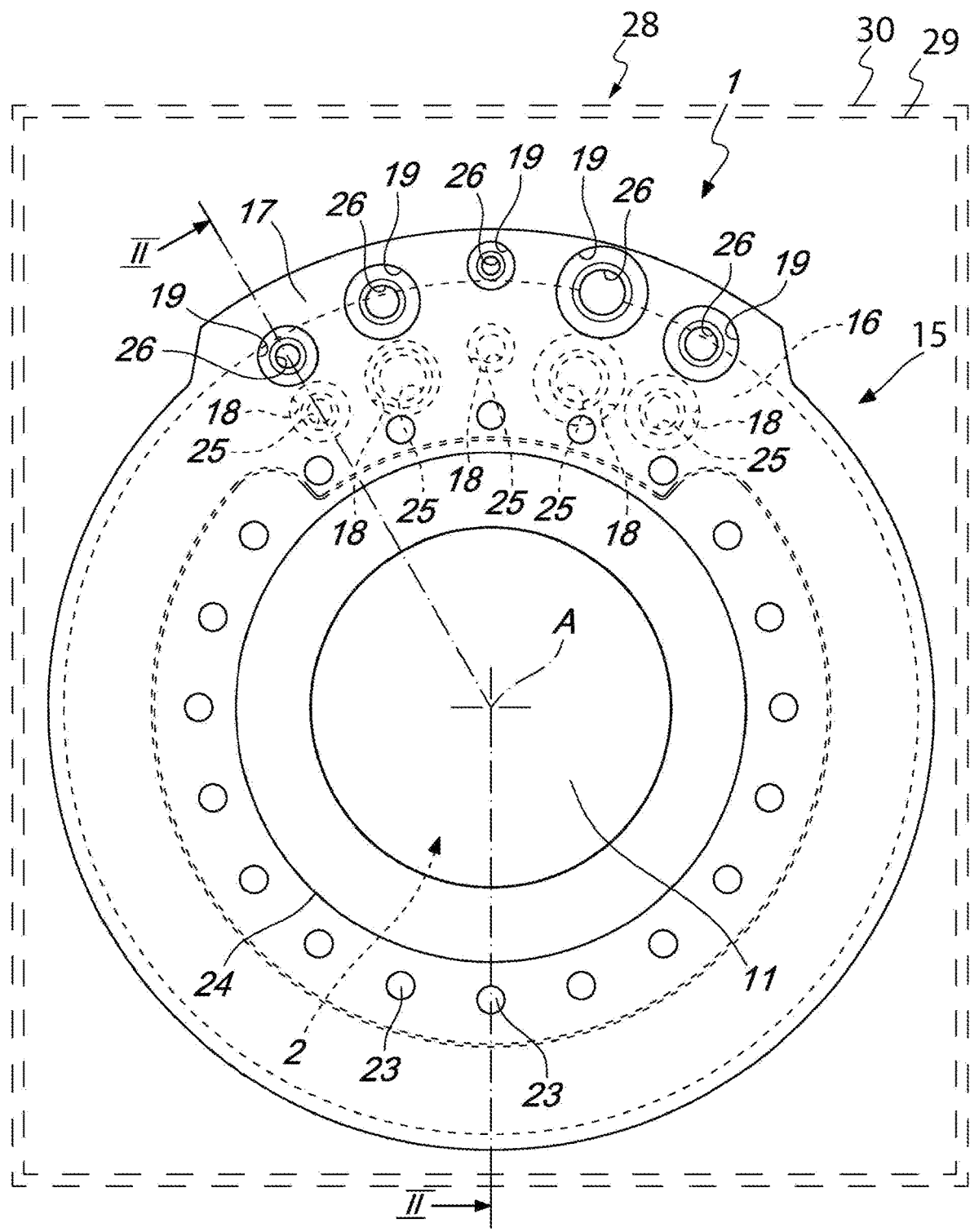
FIG. 1 is a front elevation view of a first embodiment of a device
for the transmission of rotary motion and the transfer of at least one fluid medium, according to the invention.

With particular reference to the figures, the reference numeral 1 generally designates a device for the transmission of rotary motion and the transfer of at least one fluid medium.

The device 1 comprises a planetary gear train 2 for the transmission of a rotary motion about a main axis A, which is provided with at least one reduction stage 3 which comprises a sun gear 4, which rotates about the main axis A, and an internally toothed ring gear 5 which is concentric thereto, and between which at least two planet gears 6 are engaged which are supported in rotation at least about the respective longitudinal axes which are parallel to the main axis A by a planet gear carrier 7.

The planetary gear train 2 is provided with a driving input sun gear 8 and with an output ring gear 9 and with an output planet gear carrier 10, of which one can move in rotation about the main axis A with respect to the other and acts as the follower in the system.

If the planetary gear train 2 is provided with a single reduction stage 3, then the input sun gear 8, the output ring gear 9 and the output planet gear carrier 10 are those of the stage.

If the planetary gear train 2 has two or more reduction stages 3 arranged in series, then the input sun gear 8 coincides with the sun gear 4 of the first reduction stage and the output ring gear 9 and the output planet gear carrier 10 are those of the final reduction stage.

The input sun gear 8 is associated with means for rotational actuation about the main axis A which, preferably, are constituted by drive means 11 onboard the device 1, of the type of an electric motor, a hydraulic motor or the like.

The possibility is not ruled out, however, that the input sun gear 8 can be associated with drive means external to the device 1 by way of a conventional transmission assembly.

In the embodiments shown, the planetary gear train 2 comprises two reduction stages of which a first stage 3 and a second stage 3' are arranged in series, each one of which comprises a sun gear 4 or 4', a ring gear 5 or 5', four planet gears 6 or 6' which are distributed about the main axis and angularly spaced apart by 90° (of which only two are shown in the Figures) and a planet gear carrier 7 or 7'.

In this case, the sun gear 4 of the first stage 3 constitutes the input sun gear 8 and the ring gear 5' and the planet gear carrier 7' of the second stage 3' constitute, respectively, the output ring gear 9 and the output planet gear carrier 10.

The ring gear 5 of the first stage 3 is defined inside a cover 12 which is connected laterally to a hub 13 inside which the ring gear 5'≡9 of the second stage 3' is defined. The ring gears 5 and 5'≡9 are therefore integral in rotation or in immobility with respect to the main axis A, according to the operating mode of the planetary gear train 2.

The possibility is not ruled out that the hub 13 and the output toothed ring gear 5'≡9 can be provided as separate elements and connected mechanically to each other.

Interposed between the ring gear 5'≡9 and the planet gear carrier 7≡10 of the second stage 3' are rolling elements 14, of the type of ball bearings or the like, in order to permit the free rotation of one element with respect to the other about the main axis A.

In the embodiments shown, the output planet gear carrier 7≡10 is connected integrally to a tubular shank 27, or stub axle, and the rolling elements 14 are interposed between the shank and the hub 13 associated with the output toothed ring gear 5'≡9.

The number of reduction stages 3 provided in the planetary gear train 2 and the configuration thereof can vary on the basis of the requirements of the specific application.

The device 1 is further provided with means for transferring at least one fluid medium, which comprise a rotary joint 15 which extends externally to the planetary gear train 2. More precisely, the rotary joint 15 extends externally in a radial direction with respect to the main axis A about the planetary gear train 2. In this manner it is possible to contain the axial space occupation of the device 1, in that the rotary joint 15 does not entail an increase in the axial space occupation of the device with respect to that of the planetary gear train 2 with the corresponding drive means 11.

The rotary joint 15 comprises a first body 16 which extends along the main axis A externally to the planetary gear train 2 and a second body 17 which extends externally to the first body, which are provided respectively with at least one first port 18 for the entry/exit of a fluid medium and with at least one second port 19 for the exit/entry of that fluid medium, which are in fluid communication with a corresponding annular chamber 20 which is defined between the bodies. Either the first body or the second body 16 or 17 can move by rotation about the main axis A with respect to the other.

Preferably the bodies 16 and 17 have an annular shape structure about the main axis A.

The rotary joint 15 allows the transfer from the at least one first port 18 to the at least one second port 19, or vice versa, of a fluid medium of the type of a liquid, such as water or hydraulic oil, or of a gas.

Typically, in use, the ports 18 and 19 are intended to be connected by way of threaded couplings or the like to respective lengths of tubing for the supply/return of the fluid medium to/from actuators that are fluid-operated.

Interposed between the first and the second body 16 and 17 are adapted sealing elements 21 which are positioned axially on both sides of the annular chamber 20. The characteristics and the shape structure of the sealing elements 21 used are determined, on the basis of information known to the person skilled in the art, in relation to the type of fluid medium used and to the operating pressure thereof.

According to the invention the first body 16 has a substantially annular shape structure and extends externally to the output ring gear 9 of the planetary gear train 2, being integral with it in rotation/immobility with respect to the main axis A.

In more detail the first body 16 extends externally, in a radial direction with respect to the main axis A, to the hub 13 that supports the output ring gear 9 and is integral therewith in rotation/immobility with respect to the main axis A. The second body 17 extends externally, in a radial direction with respect to the main axis A, to the first body 16.

In the embodiments shown, the first body 16 is integral with the hub 13 that supports the output ring gear 9≡5' of the second stage 3' of the planetary gear train 2.

Figure 2:
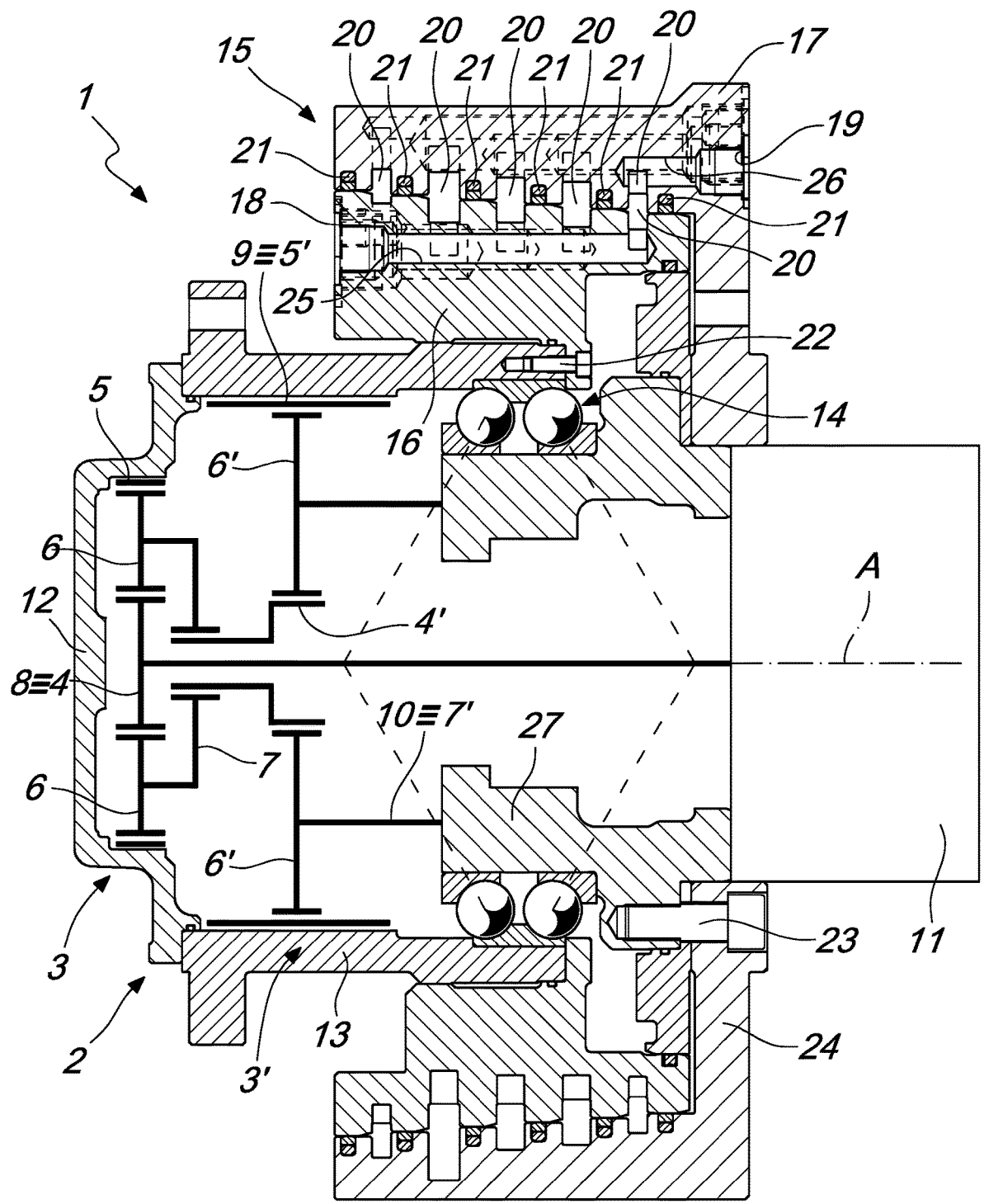
FIG. 2 is a cross-sectional view taken along the line II-II in FIG. 1, in which the elements of the planetary gear train are shown in schematic form.

In a first embodiment (FIGS. 1-2) the first body 16 and the hub 13 are associated by way of first mechanical connection means 22, of the type of screws interposed and distributed about the main axis A.

Figure 3:
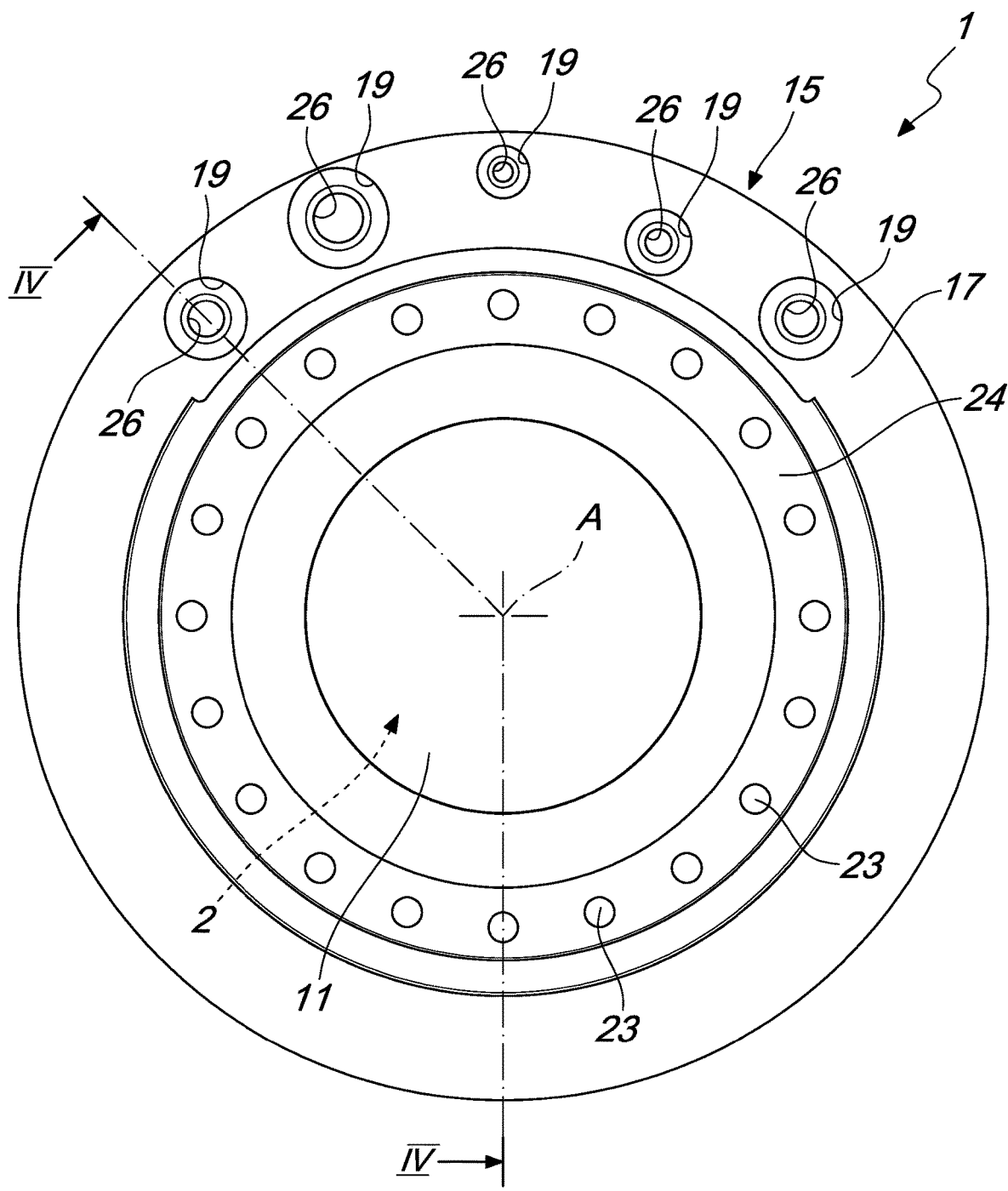
FIG. 3 is a first front elevation view of a second embodiment of a device according to the invention.
Figure 4:
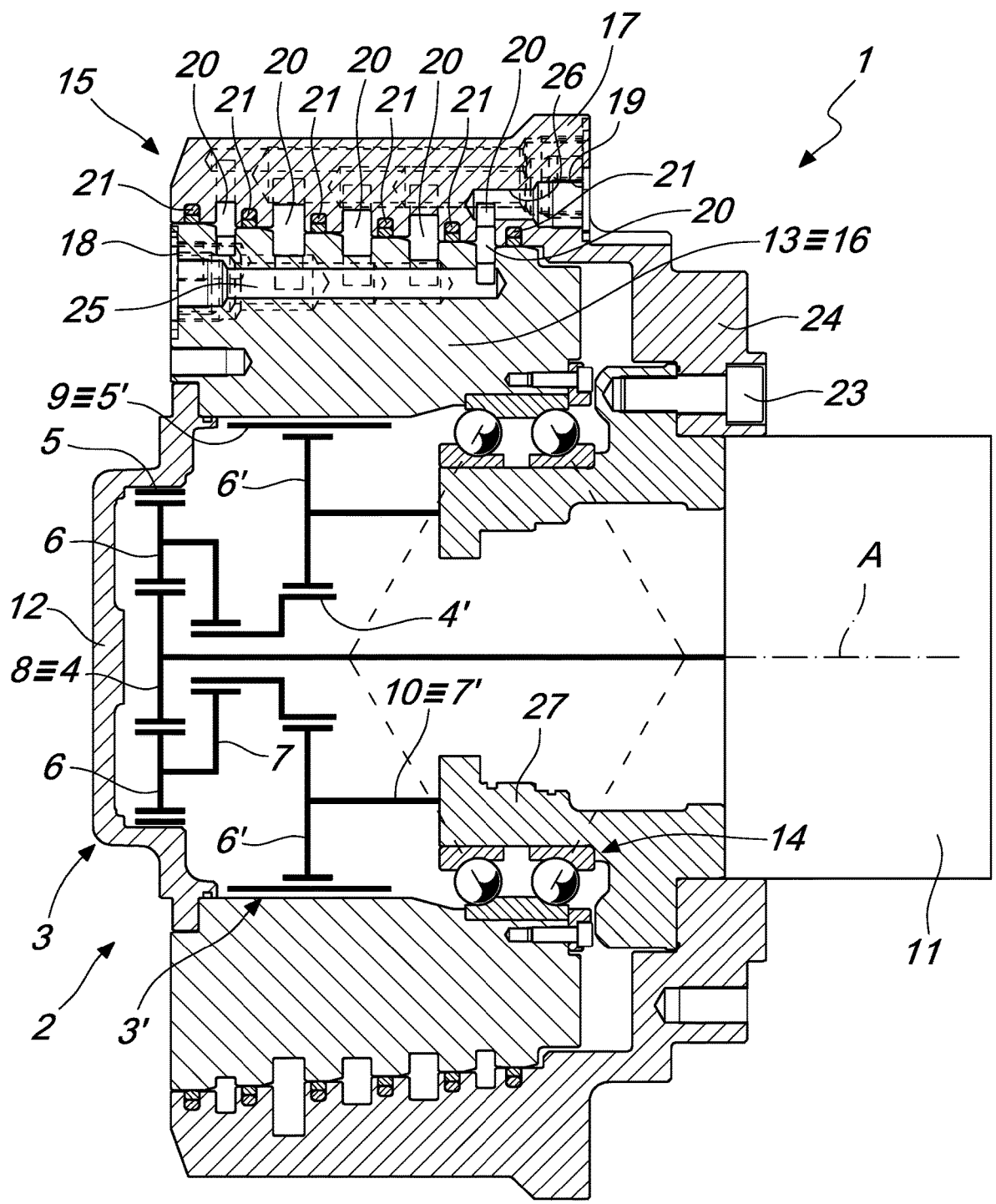
FIG. 4 is a cross-sectional view taken along the line IV-IV in FIG. 3, in which the elements of the planetary gear train are shown in schematic form.
Figure 5:
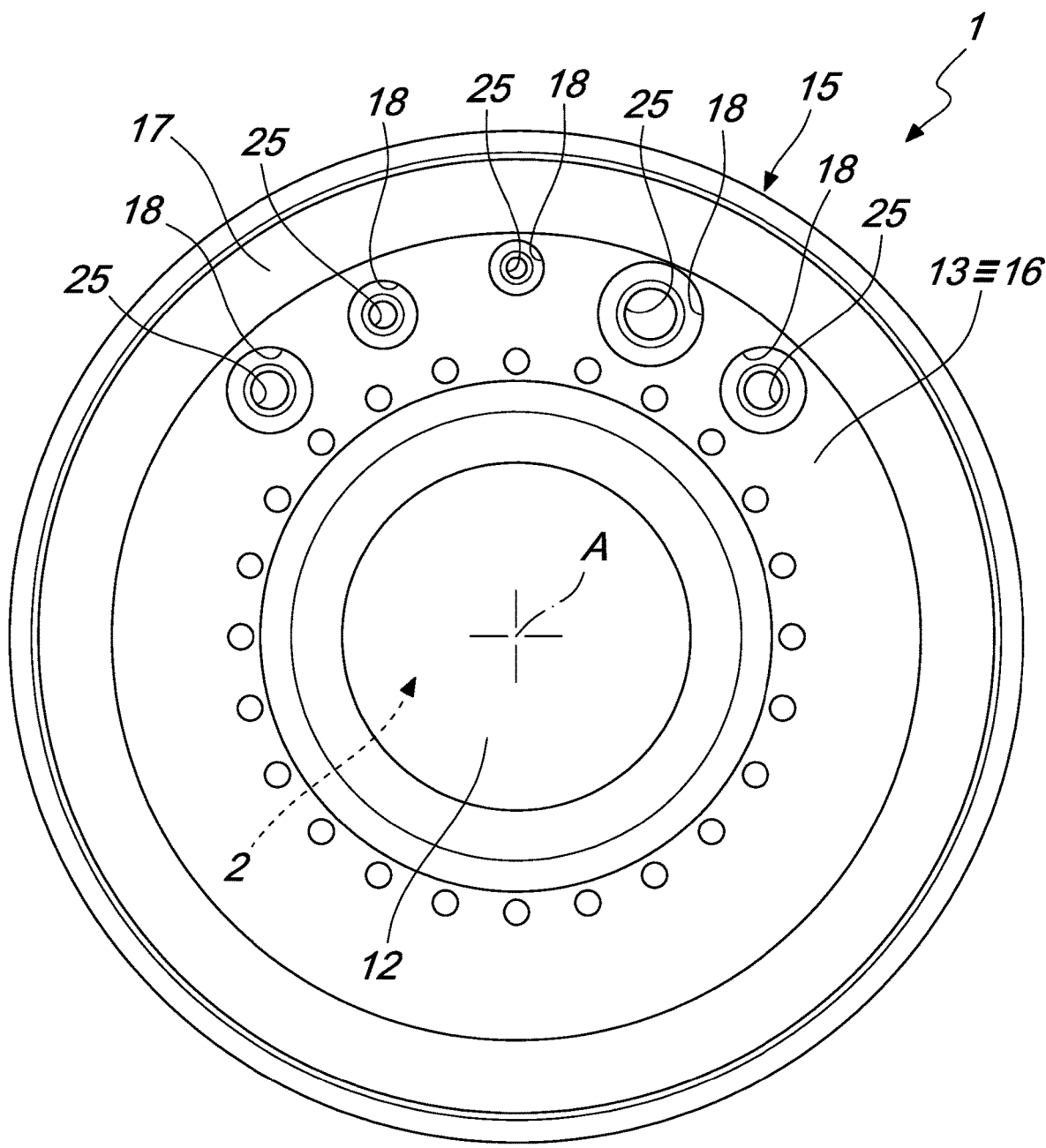
FIG. 5 is a second front elevation view from a direction opposite to the view of the device in FIG. 3.

In a second embodiment (FIGS. 3-5) the first body 16 and the hub 13 are provided mutually integral in a single piece.

However, different types of connection of the first body 16 and of the hub 13, which render them integral in rotation/immobility with respect to the main axis A, are not ruled out.

Conveniently the second body 17 and the output planet gear carrier 10 are integral in immobility/rotation with respect to the main axis A.

In the embodiments shown, the second body 17 is integral with the output planet gear carrier 10≡7' of the second stage 3' of the planetary gear train 2.

The second body 17 and the output planet gear carrier 10≡7' are associated by way of second mechanical connection means 23, of the type of screws interposed and distributed about the main axis A. The second body 17 is provided with a connecting flange 24, for the insertion of such screws 23, which extends in a radial direction toward the main axis A to join with the output planet gear carrier 10≡7' at a first axial end of the rotary joint 15.

In the embodiments shown, the flange 24 is connected to the output planet gear carrier 10≡7' indirectly by way of the shank 27, but the possibility is not ruled out that the two elements can be connected directly.

Furthermore it is possible for the flange 24 to be provided as an element separate from the second body 17 and mechanically connected thereto.

The possibility is not ruled out however that, alternatively, there can be different types of connection interposed between the second body 17 and the output planet gear carrier 10≡7' i.e. that they can be provided integral in a single piece.

Preferably, the rotary joint 15 has two or more first ports 18 and a plurality of corresponding second ports 19 which are distributed around the main axis A, and a plurality of annular chambers 20 which are distributed along that axis, each annular chamber 20 being in fluid communication with a respective first port 18 and with the corresponding second port 19, but being isolated from the other annular chambers 20 by way of interposed sealing elements 21.

Respective fluid mediums, even of mutually different types, can be transferred through the annular chambers 20 and the corresponding ports 18 and 19.

In the embodiments shown there are five first ports 18, which are associated with five respective second ports 19 and five annular chambers 20.

It is evident that the number and the distribution of the ports 18 and 19 and of the corresponding annular chambers 20 can vary as a function of the requirements of the specific application.

The first ports 18 are arranged at a second axial end of the rotary joint 15, which is arranged opposite the first, and there are respective first channels for connecting each first port 18 with the respective annular chamber 20, which extend axially through the first body 16.

The second ports 19 are arranged at the first axial end of the rotary joint 15 and there are respective second channels 26 for connecting each second port 19 with the respective annular chamber 20, which extend axially through the second body 17.

The possibility is not ruled out that the second ports 19 can be arranged on the outer shell of the second body 17 at the respective annular chambers 20 and, therefore, that the second channels extend radially through the second body, i.e. that the second ports 19 are connected directly to the respective annular chambers 20.

It should be noted that the annular chambers 20 extend substantially radially with respect to the main axis A and with a different depth inside the bodies 16 and 17 so that the corresponding channels 25 and 26 do not interfere with the other annular chambers 20.

In order to allow the mounting of the bodies 16 and 17 without damaging the sealing elements 21, the facing surfaces of the bodies have a diameter that increases/decreases axially going from one longitudinal end to the other, so assuming a "stepped" shape structure.

The dimensioning of the ports 18 and 19, of the annular chambers 20, and of the channels 25 and/or 26 if any is carried out as a function of the flow-rate of the fluid medium to be transferred on the basis of information known to the person skilled in the art.

In use the device 1 can be incorporated, for example, in a movement arm 28 of the type that comprises at least two longitudinal sections 29, 30 arranged in series, of which a second section 30 is movable with respect to the first section 29 in rotation about its own longitudinal axis, and fluid-operated actuation means which are associated with the second section or downstream thereof and are connected to a fluid-operated management circuit which is associated with the first section or upstream thereof.

Interposed between the first section and the second section is at least one device 1 with the first section connected to one of the groups of elements that comprise the output ring gear 9≡5' and the first body 16 or the output planet gear carrier 10≡7' and the second body 17, and the second section being connected to the other group of elements. Furthermore respective tubes are generally provided for connecting the fluid-operated management circuit with the first ports 18 and the second ports 19 with the actuation means.

If multiple rotating movements on different axes need to be transmitted between the sections of the arm, respective devices 1 can be interposed between those sections and positioned with the corresponding axes not aligned.

Operation of the present invention is the following.

In use, the device 1 makes it possible to transmit a rotary motion about the main axis A of an element that can move with respect to a fixed element, of which:

if the output ring gear 9≡5' acts as the follower element and the output planet gear carrier 10≡7' as the fixed element of the planetary gear train 2, then the movable element is connected to the hub 13 which is integral with the first body 16 and the fixed element is connected to the output planet gear carrier 10≡7' which is integral with the second body 17, i.e. if the output planet gear carrier 10≡7' acts as the follower element and the output ring gear 9≡5' as the fixed element of the planetary gear train 2, then the movable element is connected to the output planet gear carrier 10≡7' which is integral with the second body 17 and the fixed element is connected to the hub 13 which is integral with the first body 16.

Furthermore, by way of the rotary joint 15 it is possible to transfer one or more fluid mediums, even mutually different ones, upstream and downstream of the device 1 without increasing the axial space occupation with respect to that of the planetary gear train 2 on its own.

In practice it has been found that the invention as described achieves the intended aim and objects and, in particular, attention is drawn to the fact that the device according to the invention enables the transmission of a continuous and bidirectional rotary motion and the transfer of one or more fluid mediums, liquid and/or gaseous, with contained bulk.

Furthermore the device according to the invention makes it possible to limit the presence of tube bundles hung outside the machines in which it is incorporated, and to contain the space occupation, in order not to penalize its dimensioning and its performance.

Furthermore, the device according to the invention makes it possible to preserve the integrity of the connecting tube bundles for the transfer of the fluid mediums, so as to optimize the reliability of the machines in which it is incorporated.

The invention, thus conceived, is susceptible of numerous modifications and variations, all of which are within the scope of the appended claims.

Moreover, all the details may be substituted by other, technically equivalent elements.

In practice the materials employed, as well as the contingent dimensions and shapes, may be any according to requirements without for this reason departing from the scope of protection claimed herein.

The disclosures in Italian Patent Application No. 102018000002424 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A device for transmission of rotary motion and transfer of at least one fluid medium which comprises:
   a planetary gear train for the transmission of rotary motion about a main axis which has at least one reduction stage which is provided with a sun gear, which rotates about said main axis, and a toothed ring gear which are mutually concentric and between which at least two planetary gears are engaged which are supported in rotation at least about respective longitudinal axes which are parallel to said main axis by a planetary gear carrier, the planetary gear train being provided with a driving input sun gear and with an output ring gear and with an output planetary gear carrier, of which one can move in rotation about said main axis with respect to the other, and
   a rotary joint positioned radially outward of the planetary gear train and which extends externally to said planetary gear train, the rotary joint adapted for the transfer of the at least one fluid medium via a plurality of annular chambers, each of which extending substantially radially with respect to the main axis and with a different radial depth with respect to the main axis so that corresponding ones of a plurality of channels extending therefrom longitudinally and substantially parallel with the main axis do not interfere with other ones of the plurality of annular chambers.

2. The device according to claim 1, wherein said rotary joint comprises a first body which extends along said main axis about said output ring gear and a second body which extends around said first body, which are provided respectively with at least one first port for entry/exit of a fluid medium and with at least one corresponding second port for exit/entry of said fluid medium, which are in fluid communication with a corresponding one of the plurality of annular chambers which is defined between said bodies, one of either the first or the second body being movable with respect to the other in rotation about said main axis and the first body being integral with the output ring gear in rotation/immobility with respect to said main axis.

3. The device according to claim 2, wherein said first body is associated with said output ring gear by way of a mechanical connection.

4. The device according to claim 2, wherein said first body and said output ring gear are provided mutually integral in a single piece.

5. The device according to claim 2, wherein said second body and said output planetary gear carrier are integral in immobility/rotation with respect to said main axis.

6. The device according to claim 5, wherein said second body is associated with said output planetary gear carrier by way of a mechanical connection.

7. The device according to claim 6, wherein said second body comprises a flange for connection to said output planetary gear carrier.

8. The device according to claim 5, wherein said second body comprises a flange for connection to said output planetary gear carrier.

9. The device according to claim 2, wherein said first body and said second body have a substantially annular shape structure around said main axis.

10. The device according to claim 2, wherein each of the plurality of channels is configured for connecting at least one of either said at least one first port and said at least one second port and the corresponding annular chamber.

11. The device according to claim 10, wherein the at least one first port and the at least one second port is arranged at the mutually opposite axial ends, respectively, of the first and of the second body.

12. The device according to claim 11, wherein said rotary joint comprises a plurality of said first ports and a plurality of corresponding second ports which are distributed around said main axis, and wherein the plurality of said annular chambers are distributed along said axis each one of which is in fluid communication with a respective first port and with the corresponding second port and is isolated from the other annular chambers.

13. The device according to claim 10, wherein said rotary joint comprises a plurality of said first ports and a plurality of corresponding second ports which are distributed around said main axis, and wherein the plurality of said annular chambers are distributed along said axis each one of which is in fluid communication with a respective first port and with the corresponding second port and is isolated from the other annular chambers.

14. The device according to claim 2, wherein said rotary joint comprises a plurality of said first ports and a plurality of corresponding second ports which are distributed around said main axis, and wherein the plurality of said annular chambers are distributed along said axis each one of which is in fluid communication with a respective first port and with the corresponding second port and is isolated from the other annular chambers.

15. A movement arm, comprising at least two longitudinal sections arranged in a series, of which a second section is movable with respect to a first section in rotation about its own longitudinal axis, and fluid operated actuation means which are associated with the second section or downstream thereof and are connected to a fluid-operated management circuit which is associated with the first section or upstream thereof, wherein the movement arm further comprises at least one device according to claim 2 which is interposed between said first section and said second section, the first section being connected to one of the groups of elements which comprise said output ring gear and said first body or said output planetary gear carrier and said second body, and respective tubes being provided for the connection of said fluid-operated management circuit with said at least one first port and of said at least one second port with said actuation means.

16. The movement arm according to claim 15, wherein said second body and said output planetary gear carrier are integral in immobility/rotation with respect to said main axis.

17. The movement arm according to claim 15, wherein said first body and said second body have a substantially annular shape structure around said main axis.

18. The movement arm according to claim 15, wherein said rotary joint comprises a plurality of said first ports and a plurality of corresponding second ports which are distributed around said main axis, and wherein the plurality of said annular chambers are distributed along said axis each one of which is in fluid communication with a respective first port and with the corresponding second port and is isolated from the other annular chambers.

19. The movement arm according to claim 15, further comprising a drive or transmission associated with said input sun gear for rotational actuation of the input sun gear about the main axis.

20. The device according to claim 1, further comprising a drive or transmission associated with said input sun gear for rotational actuation of the input sun gear about the main axis.

* * * * *